(12) United States Patent
Kim et al.

(10) Patent No.: US 8,566,958 B2
(45) Date of Patent: Oct. 22, 2013

(54) METHOD FOR AUTHORIZING CONTENTS PLAY RIGHTS IN USE OF A RECORDING MEDIUM

(75) Inventors: Hwan-joon Kim, Seoul (KR); Dae-youb Kim, Seoul (KR); Maeng-hee Sung, Seoul (KR); Weon-il Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1007 days.

(21) Appl. No.: 11/407,147

(22) Filed: Apr. 20, 2006

(65) Prior Publication Data
US 2007/0006251 A1    Jan. 4, 2007

(30) Foreign Application Priority Data
Jul. 1, 2005  (KR) .................. 10-2005-0059175

(51) Int. Cl.
*H04L 29/06* (2006.01)
(52) U.S. Cl.
USPC .................................................. 726/29
(58) Field of Classification Search
USPC .............................................. 726/26–33
See application file for complete search history.

(56) References Cited

U.S. PATENT DOCUMENTS

| | | | |
|---|---|---|---|
| 2002/0196941 A1* | 12/2002 | Isaacson et al. | 380/231 |
| 2004/0003139 A1* | 1/2004 | Cottrille et al. | 709/331 |
| 2004/0158731 A1* | 8/2004 | Narin et al. | 713/200 |
| 2005/0039032 A1* | 2/2005 | Babowicz et al. | 713/193 |
| 2005/0114689 A1* | 5/2005 | Strom et al. | 713/193 |

FOREIGN PATENT DOCUMENTS

| | | |
|---|---|---|
| KR | 2001-69723 A | 7/2001 |
| KR | 2004-97120 A | 11/2004 |

* cited by examiner

*Primary Examiner* — Jeffrey D Popham
(74) *Attorney, Agent, or Firm* — Sughrue Mion, PLLC

(57) ABSTRACT

A method for authorizing an off-line image device to play contents in use of a recording medium, including recording an encrypted key on a recording medium; recording contents on the recording medium using the encrypted key; and recording information as to a play right to play the contents recorded on the recording medium. Thus, the off-line image device can be authorized to play contents in use of the recording medium. As a result, the off-line image device can play contents that are recorded on the recording medium and must be authorized to play the contents.

7 Claims, 6 Drawing Sheets

FIG. 3A

| RECORDING DEVICE | IMAGE DEVICE A |
|---|---|
| RECORDED CONTENTS | CONTENTS a, CONTENTS b, CONTENTS c |
| PLAY DEVICE | IMAGE DEVICE A, IMAGE DEVICE B |
| PLAYED CONTENTS | CONTENTS a, CONTENTS b, CONTENTS c |

FIG. 3B

| MKB_CEK | |
|---|---|
| RECORDING RIGHT | E [CEK, HASH VALUE(MKB_CEK) \|\| RECORDING AUTHORIZED DEVICE (IMAGE DEVICE A) \|\| RECORDING AUTHORIZED CONTENTS (CONTENTS a, CONTENTS b, CONTENTS c)] |
| PLAY RIGHT | E [CEK, HASH VALUE(MKB_CEK) \|\| PLAY AUTHORIZED DEVICE (IMAGE DEVICE A, IMAGE DEVICE B) \|\| PLAY AUTHORIZED CONTENTS (CONTENTS a, CONTENTS b, CONTENTS c)] |

FIG. 5

| MKB_CEK | |
|---|---|
| PALY RIGHT | E [CEK, HASH VALUE(MKB_CEK) \|\| PLAY AUTHORIZED DEVICE (IMAGE DEVICE A, IMAGE DEVICE B) \|\| PLAY AUTHORIZED CONTENTS (CONTENTS a, CONTENTS b, CONTENTS c) |
| CEK_CONTENTS | E [CEK,CONTENTS] |

METHOD FOR AUTHORIZING CONTENTS PLAY RIGHTS IN USE OF A RECORDING MEDIUM

CROSS-REFERENCE TO RELATED APPLICATIONS

This application claims priority under 35 U.S.C. §119 (a) from Korean Patent Application No. 2005-59175 filed on Jul. 1, 2005, in the Korean Intellectual Property Office, the disclosure of which is incorporated herein by reference.

BACKGROUND OF THE INVENTION

1. Field of the Invention

The present invention relates to a method for authorizing contents play rights, and more particularly, to a method for authorizing an off-line image device to play contents.

2. Description of the Related Art

Image devices capable of decoding and playing contents, particularly, paid contents, must be limited. In other words, image devices capable of playing contents provided from contents providers must be limited to image devices authorized to play contents by the contents providers.

Image devices capable of recording contents provided from contents provider on recording media must be also limited to image devices authorized to record the contents by the contents providers.

Image devices desiring to record and/or play contents must be connected to contents providers on-line. Thus, the image devices can be authorized to record and/or play the contents by the contents providers. Therefore, off-line image devices cannot be authorized to record and/or play contents.

As a result, the image devices authorized to record the contents can record the contents on recording media, but it is impossible to install the recording media into the off-line image devices to play the contents recorded on the recording media. This is because the off-line image devices are not able to be authorized to play the contents.

SUMMARY OF THE INVENTION

Accordingly, an aspect of the present invention is to address the above-mentioned and/or problems, and another aspect of the present invention is to provide a method for authorizing an off-line image device to play contents from a recording medium.

According to an aspect of the present invention, there is provided a method for authorizing a contents play right, including: recording an encrypted key on a recording medium; recording contents encrypted using the key on the recording medium; and recording information as to the play right to play the contents recorded on the recording medium.

The play right may include information as to a play authorized device authorized to play the contents recorded on the recording medium.

The recording of the encrypted key on the recording medium, the recording of the contents encrypted using the key on the recording medium, and the recording of the information as to the play right to play the contents recorded on the recording medium may be performed by a recording authorized device authorized by a contents provider providing the contents recorded on the recording medium to record the contents.

The recording authorized device may be an image device verified as a trusted image device among several image devices requesting recording rights to the contents of the contents provider.

The method may further include: determining whether an image device corresponds to the play authorized device with reference to the information of the play right recorded on the recording medium, the information being as to the play authorized device; and if it is determined that the image device corresponds to the play authorized device, decoding and playing the encrypted contents recorded on the recording medium using the image device.

The play authorized device may be an image device authorized by the contents provider providing the contents recorded on the recording medium to play the contents recorded on the recording medium.

The play authorized device may be an image device that is not connected to the contents provider and a recording authorized device authorized by the contents provider to record the contents so as to communicate the contents provider and the recording authorized device.

The play authorized device may be an image device verified as a trusted image device among image devices requesting the play right to the contents of the contents provider.

The play right may include information as to play authorized contents of a plurality of contents that are recorded on the recording medium and authorized to be played by the play authorized device.

The method may further include: determining whether an image device corresponds to the play authorized device with reference to the information of the play right recorded on the recording medium, the information being as to the play authorized device; if it is determined that the image device corresponds to the play authorized device, determining whether the contents recorded on the recording medium correspond to the play authorized contents with reference to the information of the play right as to the play authorized contents using the image device; and if it is determined that the contents recorded on the recording medium correspond to the play authorized contents, decoding and playing the contents recorded on the recording medium using the image device.

BRIEF DESCRIPTION OF THE DRAWINGS

The above aspects and features of the present invention will be more apparent by describing certain exemplary embodiments of the present invention with reference to the accompanying drawings, in which:

FIG. 3A is a view illustrating a message for requesting recording and/or play rights;

FIG. 3B is a view illustrating a message used for authorizing recording and/or play rights;

FIG. 5 is a view illustrating information recorded on a recording medium; and

DETAILED DESCRIPTION OF THE EXEMPLARY EMBODIMENTS

Figure 1:
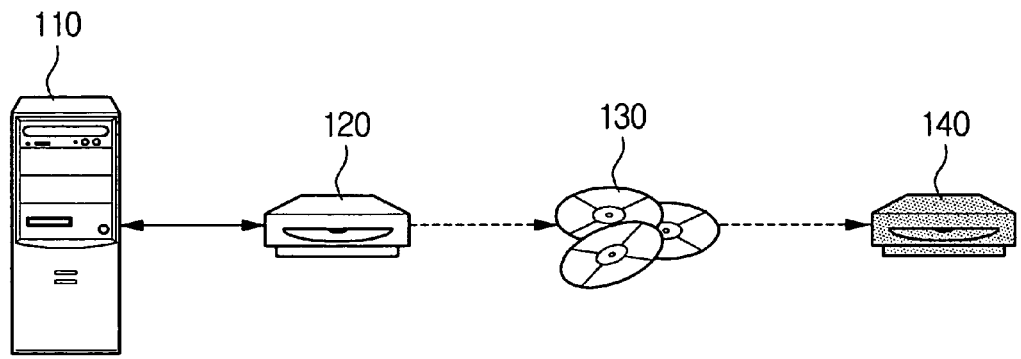
FIG. 1 is a view illustrating a system adopting a method for authorizing a contents play right according to an exemplary embodiment of the present invention.

Certain exemplary embodiments of the present invention will be described in greater detail with reference to the accompanying drawings.

In the following description, the same drawing reference numerals are used for the same elements even in different drawings. The matters defined in the description such as a detailed construction and elements are provided merely to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a view illustrating a system adopting a method for authorizing a contents play right according to an exemplary embodiment of the present invention. As shown in FIG. 1, the present system includes a contents providing server 110, an image device A 120, a recording medium 130, and an image device B 140.

The contents providing server 110 encrypts contents using a broadcast encryption (BE) method to provide the contents.

The image device A 120 is connected to the contents providing server 110 by wire and/or wireless transmission so as to communicate with the contents providing server 110. The image device A 120 can record the contents provided from the contents providing server 110 on the recording medium 130. However, the image device A 120 must be a recording authorized device so as to perform a recording operation.

The recording authorized device means an image device authorized (hereinafter referred to as a recording right) to record specific contents provided from the contents providing server 110 on the recording medium 130.

The image device B 140 is an off-line image device that is not connected to the contents providing server 110 to communicate with the contents providing server 110 and, is thus, different from the image device A 120 in that regard. Also, the image device B 140 is not connected to the image device A 120 to communicate with the image device A 120.

However, the image device B 140 may play the contents recorded on the recording medium 130 by the image device A 120. Here, the image device B 140 must be a play authorized device so as to perform a play operation.

The play authorized device means an image device authorized (hereinafter referred to as a play right) to play the specific contents recorded on the recording medium 130.

A process of authorizing the image device B 140 as an off-line image device to play the contents recorded on the recording medium 130 in the system shown in FIG. 1 will now be described.

Figure 2:
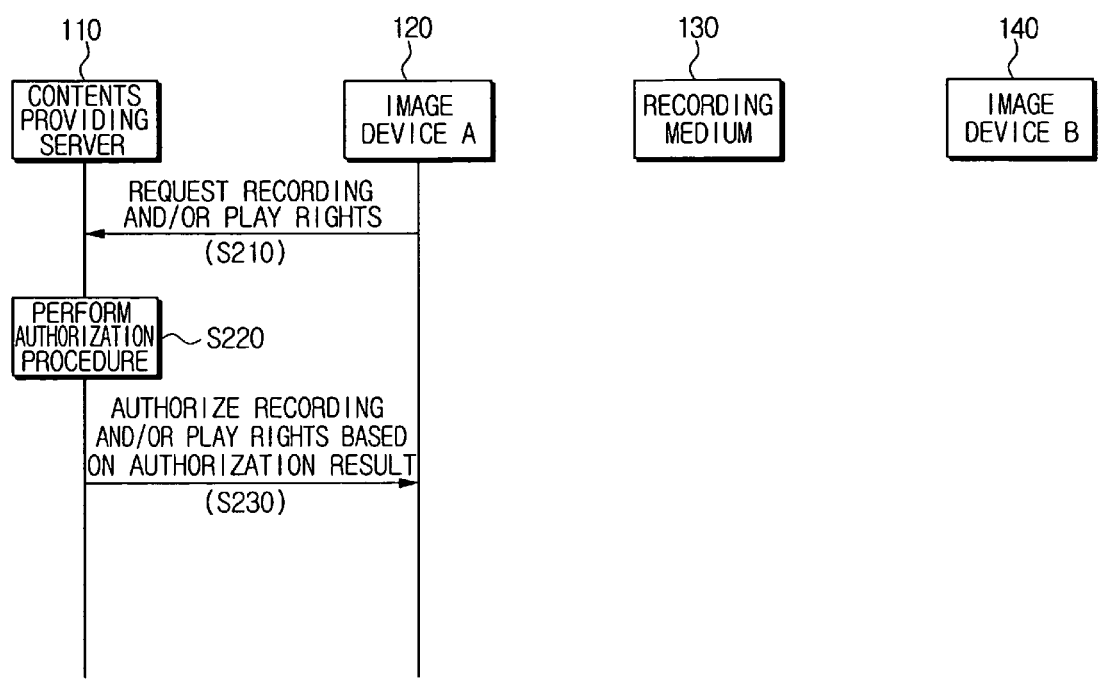
FIG. 2 is a view illustrating a process of requesting and/or authorizing recording and/or play rights in a method for authorizing a contents play right according to an exemplary embodiment of the present invention.

FIG. 2 is a view illustrating a process of requesting and/or authorizing recording and/or play rights in a method for authorizing a contents play right according to an exemplary embodiment of the present invention.

Referring to FIG. 2, in operation S210, the image device A 120 requests recording and/or play rights of the contents providing server 110. A message for requesting the recording and/or play rights includes information as to a recording device, recorded contents, a play device, and played contents as shown in FIG. 3A.

The information as to the recording device is information as to image devices desiring to be authorized to record the contents provided from the contents providing server 110 on the recording medium 130. As shown in FIG. 3A, the image device A 120 is designated as the recording device.

The information as to the recorded contents is information as to contents of the contents provided from the contents providing server 110 the recording device desires to be authorized to record. As shown in FIG. 3A, contents a, b, and c are designated as the recorded contents.

The recorded contents are designated as contents names as shown in FIG. 3A, but may be designated using different methods. For example, the recorded contents may be designated as dates at which contents are provided. Here, if the recorded contents are designated as "2005.5.1-2005.5.31," contents provided by the contents providing server 110 on 2005.5.1-2005.5.31 correspond to the recorded contents.

The information as to the play device is information as to image devices desiring to be authorized to play the contents recorded on the recording medium 130. As shown in FIG. 3A, the image devices A and B, 120 and 140 respectively, are designated as the play device.

The information as to the played contents is information as to contents of the contents recorded on the recording medium 130 the play device desires to be authorized to play. As shown in FIG. 3A, the contents a, b, and c are designated as the played contents.

Like the recorded contents, the played contents may not be designated as contents names but may be designated using different methods. For example, the played contents may be designated as dates at which contents are recorded. Here, if the played contents are designated as "2005.5.1-2005.5.31," contents recorded on the recording medium 130 on 2005.5.1-2005.5.31 correspond to the played contents.

Referring to FIG. 2 again, in operation S220, the contents providing server 110 receives the request for the recording and/or play rights and performs a procedure of authorizing the recording device and the play device. In detail, the contents providing server 110 determines whether the recording device and the play device are trusted devices or revoked devices.

In operation S230, the contents providing server 110 authorizes the recording and/or play rights based on the authorization result obtained in operation S220. A message for authorizing the recording and/or play rights includes information as to contents encryption key encrypted as a media key block (MKB_CEK), a recording right, and a play right as shown in FIG. 3B.

The MKB_CEK means a contents encryption key (CEK) encrypted as a media key block (MKB)

The information as to the recording right is information to which a hash value, a recording authorized device, and recording authorized contents are bound. Here, an electronic signature or an encryption method using a CEK may be used as a binding method. The hash value is a hash value of the MKB_CEK. Also, the recording authorized device is an image device authorized to record contents provided from the contents providing server 110 on the recording medium 130. Also, the recording authorized contents are contents the recording authorized device is authorized to record on the recording medium 130.

The information as to the play right is information to which a hash value, a play authorized device, and play authorized contents are bound. Here, an electronic signature or an encryption method using a CEK may be used as a binding method. The hash value is the hash value of the MKB_CEK. The play authorized device is an image device authorized to play contents recorded on the recording medium 130. Also, the play authorized contents are contents of the contents recorded on the recording medium 130 the play authorized device is authorized to play.

The recording authorized device, the recording authorized contents, the play authorized device, and the play authorized contents constituting the message for authorizing the recording and/or play rights shown in FIG. 3B coincide with the recording device, the recorded contents, the play device, and the played contents constituting the message for requesting the recording and/or play rights shown in FIG. 3A. This corresponds to a case where the recording and/or play rights requested by the image device A 120 in operation S210 are accommodated by the contents providing server 110.

However, only a part of the recording and/or play rights requested by the image device A 120 in operation S210 may be accommodated by the contents providing server 110. For example, the played contents requested in operation S210 may be the contents a, b, and c, while the play authorized contents authorized in operation S230 may be the contents a. As another example, the image device B 140 of the play devices requested by the image device A 120 in operation S210 may be determined as a revoked image device, and thus, the play authorized device authorized in operation S230 may be the image device A 120.

A process of recording a play right on the recording medium 130 using the image device A 120 as the recording authorized device to authorize a play right of the image device B 140 as the play authorized device will now be described.

Figure 4:
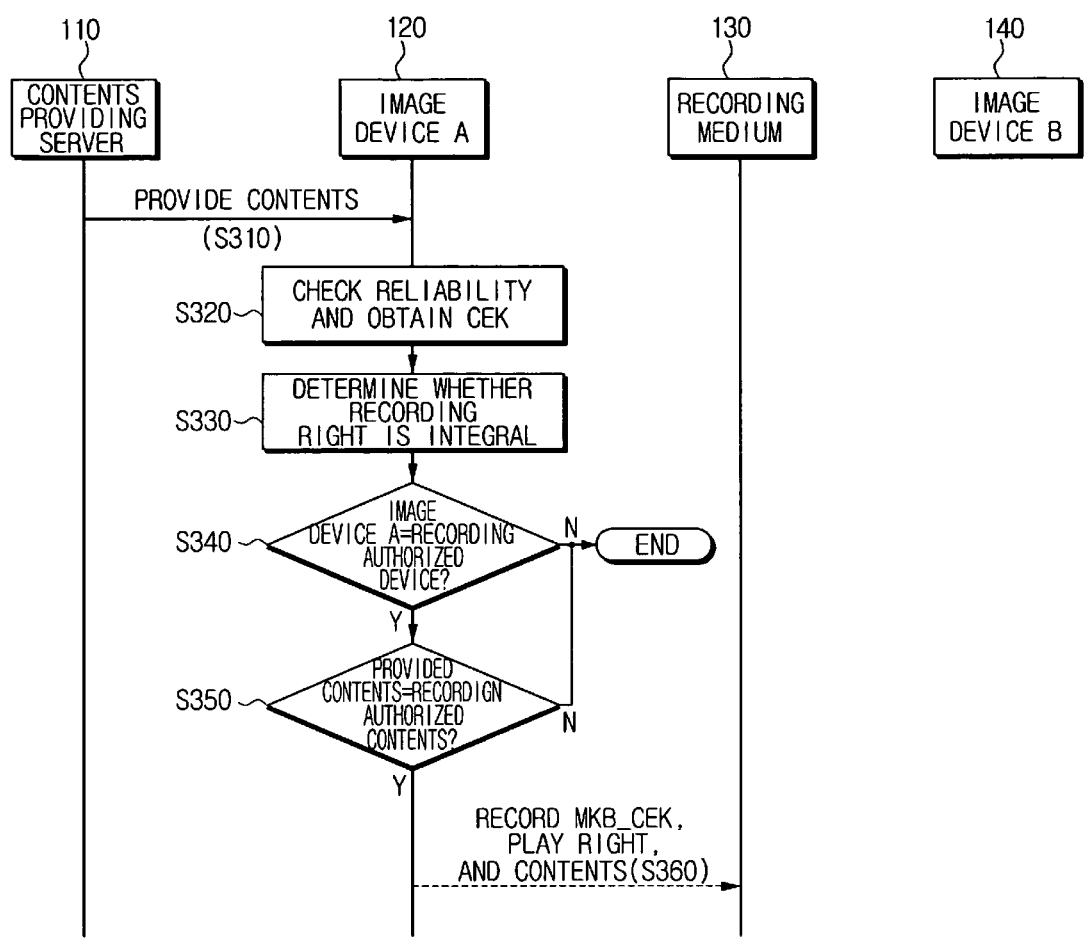
FIG. 4 is a view illustrating a process of authorizing a play right in use of a recording medium in a method for authorizing a contents play right according to an exemplary embodiment of the present invention.

FIG. 4 is a view illustrating a process of authorizing a play right in use of a recording medium in a method for authorizing a contents play right according to an exemplary embodiment of the present invention. Referring to FIG. 4, in operation S310, the contents providing server 110 provides contents to the image device A 120. The contents provided by the contents providing server 110 is encrypted using a CEK.

In operation S320, the image device A 120 checks reliability thereof and obtains the CEK. Here, the reliability is checked depending on whether the MKB_CEK provided in operation S230 is decodable. In other words, if the MKB_CEK is able to be decoded, the image device A 120 is a trusted device. Also, the CEK is obtained through decoding of the MKB_CEK performed in the procedure of checking the reliability.

In operation S330, the image device A 120 checks whether the recording right authorized in operation S230 is integral. In detail, in operation S330, the image device A 120 decodes the hash value of the recording right using the CEK obtained in operation S320.

In operation S340, the image device A 120 determines whether the image device A 120 corresponds to the recording authorized device, with reference to the information of the recording right as to the recording authorized device. Since the information as to the recording authorized device is encrypted using the CEK, the image device A 120 must decode the information as to the recording authorized device using the CEK prior to performing operation S340.

If the image device A 120 determines in operation S340 that the image device A 120 corresponds to the recording authorized device, the image device A 120 determines whether the contents provided in operation S310 correspond to the recording authorized contents, with reference to the information of the recording right as to the recording authorized contents in operation S350. Since the information as to the recording authorized contents is encrypted using the CEK, the image device A 120 must decode the information as to the recording authorized contents using the CEK prior to performing operation S350.

If the image device A 120 determines in operation S350 that the contents correspond to the recording authorized contents, the image device A 120 records a play right along with MKB_CEK and CEK_contents on the recording medium 130 in operation S360.

The information recorded on the recording medium 130 in operation S360 is shown in FIG. 5. The CEK_contents are contents encrypted using the CEK. The MKB_CEK and the play right may be regarded as being equal to those shown in FIG. 3B and thus will not be described in detail herein.

As described above, the image device A 120 records the contents together with the play right on the recording medium 130. Thus, it is possible to authorize play rights of off-line image devices in use of the recording medium 130.

A process of authorizing a play right of the image device B 140 as the play authorized device in use of the recording medium 130 and playing contents recorded on the recording medium 130 via the image device B 140 will now be described in detail with reference to FIG. 6.

Figure 6:
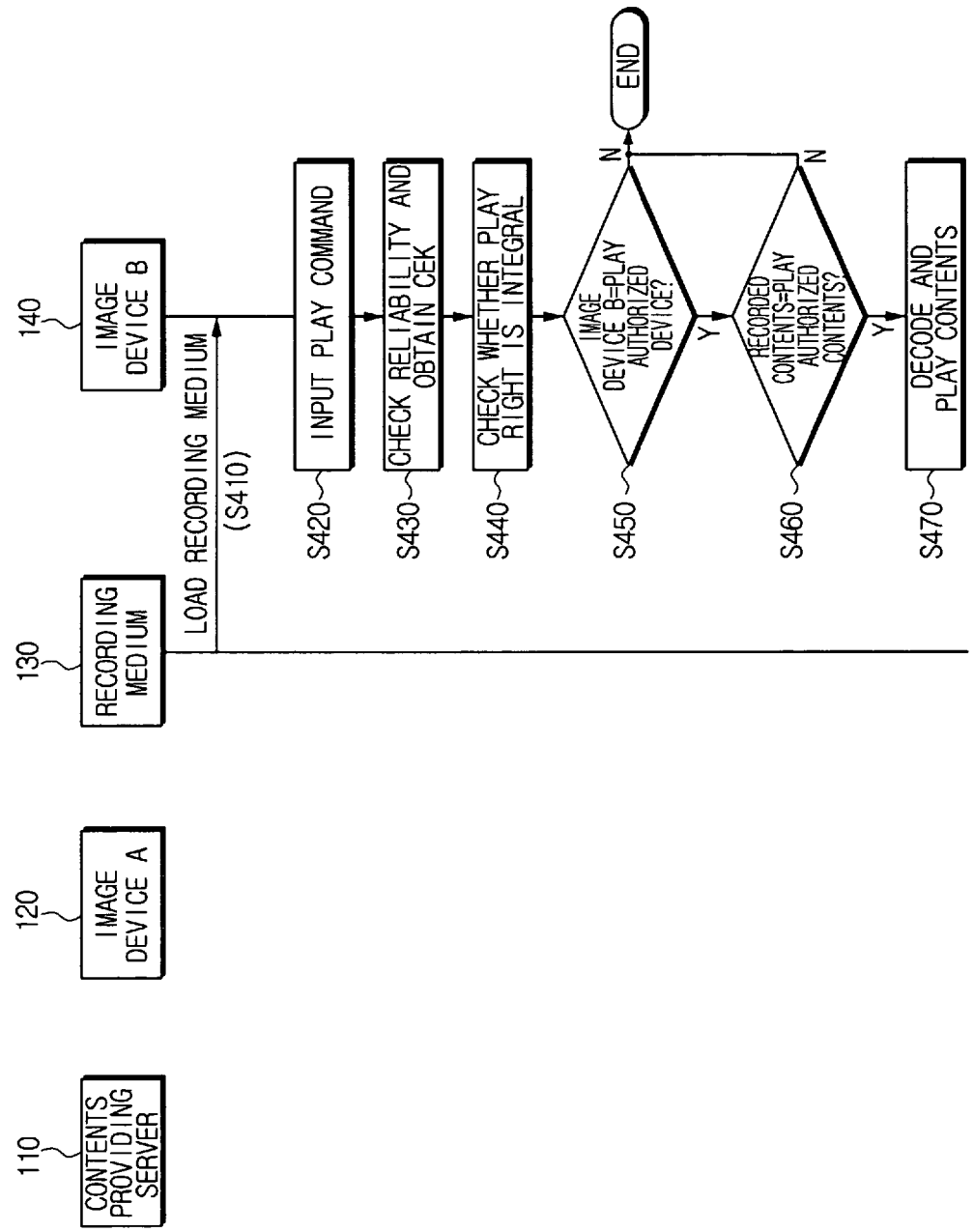
FIG. 6 is a view illustrating a process of playing contents recorded on a recording medium using an off-line image device authorized to play the contents on the recording medium in a method for authorizing a contents play right according to an exemplary embodiment of the present invention.

FIG. 6 is a view illustrating a process of playing contents on a recording medium via an off-line image device authorized by a play right in use of the recording medium in a method for authorizing a contents play right according to an exemplary embodiment of the present invention. Referring to FIG. 6, in operation S410, the recording medium 130 is loaded. In operation S420, a play command is input. In operation S430, the image device B 140 checks reliability thereof and obtains a CEK. Here, the reliability is checked depending on whether a MKB_CEK recorded on the recording medium 130 is decodable. In other words, if the MKB_CEK is decodable, the image device B 140 is a trusted device. Also, the CEK is obtained through decoding of the MKB-CEK performed in the procedure of checking the reliability.

In operation S440, the image device B 140 checks whether a play right recorded on the recording medium 130 is integral. In detail, in operation S440, the image device B 140 decodes a hash value of the play right using the CEK obtained in operation S430.

In operation S450, the image device B 140 determines whether the image device B 140 is a play authorized device, with reference to information of the play right as to a play authorized device. Since the information as to the play authorized device is encrypted using the CEK, the image device B 140 must decode the information as to the play authorized device using the CEK prior to performing operation S450.

If it is determined in operation S450 that the image device B 140 corresponds to the play authorized device, the image device B 140 determines whether the contents recorded on the recording medium 130 are play authorized contents, with reference to information of the play right as to the play authorized contents in operation S460. Since the information as to the play authorized contents are encrypted using the CEK, the image device B 140 must decode the information as to the play authorized contents using the CEK prior to performing operation S460.

If the contents recorded on the recording medium 130 correspond to the play authorized contents, the image device B 140 decodes CEK_contents recorded on the recording medium 130 and plays the decoded contents in operation S470.

According to an exemplary embodiment of the present invention, there has been described the process of authorizing the play right of the image device B 140 as the off-line image device with respect to the contents in use of the recording medium 130 to play the contents recorded on the recording medium 140 via the image device B 140.

In this embodiment, the recording and play rights have been described as information encrypted using the CEK, but they are not limited to this. For example, the recording and play rights may be regarded as information signed with electronic signatures.

Also, many types of image devices and recording media may be used.

As described above, according to an aspect of present invention, an off-line image device can be authorized to play contents in use of a recording medium. Thus, the off-line image device can play contents that are recorded on the recording medium and must be authorized to play the contents. In other words, the-offline image device can play the contents recorded on the recording medium by an image device authorized with respect to a recording right.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for authorizing a contents play right, comprising:
   transmitting, by a recording device, to a contents provider, a message for requesting a recording right to record a plurality of different contents and a play right to play the plurality of different contents, wherein the message comprises information indicating the recording device desiring to be authorized to record the plurality of different contents on a recording medium and information indicating a plurality of play devices desiring to be authorized to play the plurality of different contents from the recording medium;
   receiving, by the recording device, information as to a recording right to record the plurality of different contents, and information as to a play right to play only a part among all the plurality of different contents for which the play right is requested by the recording device, from the contents provider, wherein the information as to the play right includes information indicating the plurality of play devices as play authorized devices, and the information as to the recording right and the information as to the play right to play only the part among all of the plurality of different contents for which the play right is requested by the recording device are transmitted from the contents provider in response to the transmitted message for requesting the recording right to record the plurality of different contents and the play right to play the plurality of different contents;
   checking that the recording device is a trusted device and obtaining an encryption key by the recording device;
   determining, by the recording device, that the recording right is integral using the obtained encryption key;
   determining, by the recording device, whether the recording device corresponds to a recording authorized device with reference to the information as to the recording right;
   if it is determined that the recording device corresponds to the recording authorized device, determining, by the recording device, whether the plurality of different contents correspond to recording authorized contents with reference to the information as to the recording right;
   if it is determined that the plurality of different contents correspond to the recording authorized contents, recording an encrypted key on a recording medium;
   recording the plurality of different contents encrypted using the encryption key, on the recording medium; and
   recording the information as to the play right to play only the part of the contents on the recording medium,
   wherein the recorded information as to the play right further comprises information as to play authorized contents of only the part of the plurality of different contents that are recorded separately on the recording medium, the play authorized contents being authorized to be played by the play authorized devices, and
   wherein information as to a play right is not received for contents which the play devices are not authorized to play.

2. The method of claim 1, wherein the recording of the encrypted key on the recording medium, the recording of the contents encrypted using the key on the recording medium, and the recording of the information as to the play right to play the contents recorded on the recording medium are performed by the recording device authorized by the contents provider providing the contents recorded on the recording medium to record the contents.

3. The method of claim 1, further comprising:
   determining whether an image device corresponds to a play authorized device with reference to the information indicating the plurality of devices as the play authorized devices included in the information of the play right recorded on the recording medium; and
   decoding and playing the encrypted contents recorded on the recording medium using the image device if it is determined that the image device corresponds to the play authorized device.

4. The method of claim 3, wherein the play authorized device is an image device authorized by the contents provider providing the contents recorded on the recording medium to play the contents recorded on the recording medium.

5. The method of claim 4, wherein the play authorized device is an image device that is not connected to any of the contents provider and a recording authorized device authorized by the contents provider when playing the contents.

6. The method of claim 4, wherein the play authorized device is an image device verified as a trusted image device of image devices requesting the play right to the contents of the contents provider.

7. The method of claim 1, further comprising:
   determining whether an image device corresponds to a play authorized device with reference to the information indicating the plurality of devices as the play authorized devices included in the information of the play right recorded on the recording medium;
   determining whether the contents recorded on the recording medium correspond to the play authorized contents with reference to the information of the play right as to the play authorized contents using the image device if it is determined that the image device corresponds to the play authorized device; and
   decoding and playing the contents recorded on the recording medium using the image device if it is determined that the contents recorded on the recording medium correspond to the play authorized contents.

* * * * *